INVENTOR.
WILLIAM A. MONROE
BY Williams, David,
Hoffmann & Yount
ATTORNEYS 3,176,809
PARTICULATE MAGNETIC MATERIAL CLUTCH
WITH FRICTION BRAKE
William A. Monroe, 5259 Strawberry Lane,
Willoughby, Ohio
Filed Nov. 8, 1962, Ser. No. 236,346
18 Claims. (Cl. 192—12)

This invention relates to electromagnetic apparatus having field means for producing magnetic flux and an associated rotor means for delivering power from the apparatus when the field means is energized and, more particularly, the invention relates to novel electromagnetic apparatus of this character which embodies brake means for retarding rotation of the rotor means when the field means is de-energized.

In many situations where electromagnetic apparatus delivers power to a load to be rotatably driven it is desirable to apply a braking action to the rotor means of the apparatus to prevent spinning or coasting thereof after the field means has been de-energized. One such situation occurs in motor vehicles using clutch mechanism of the electromagnetic type and wherein it is highly desirable to prevent spinning or coasting of the clutch output member when an associated transmission is placed in neutral position.

In its broad aspect, and as one of its objects, the present invention provides novel electromagnetic apparatus having power output rotor means and field means for supplying magnetic flux thereto, and brake means adapted to be supplied with magnetic flux from the same field means and operable to prevent undesired spinning or coasting of the rotor means when power output by the latter ceases.

As another object thereof this invention provides novel electromagnetic apparatus having friction brake means which becomes effective to retard rotation of rotor means of the apparatus when the field means is de-energized and which brake means is movable by a portion of the field flux to release the rotor means whenever the field means is energized.

Still another object is to provide novel electromagnetic apparatus of the character above referred to wherein the field means is stationary and the brake means is mounted thereon, the brake means preferably providing a parallel path for field flux.

Additionally, this invention provides novel coupling apparatus of the magnetic particle type and embodying brake means for retarding rotation of one of a pair of coupling members, the brake means being actuatable to a brake-released condition by flux from the same field means as that which controls the condition of the particulate magnetic material.

Figure 1:
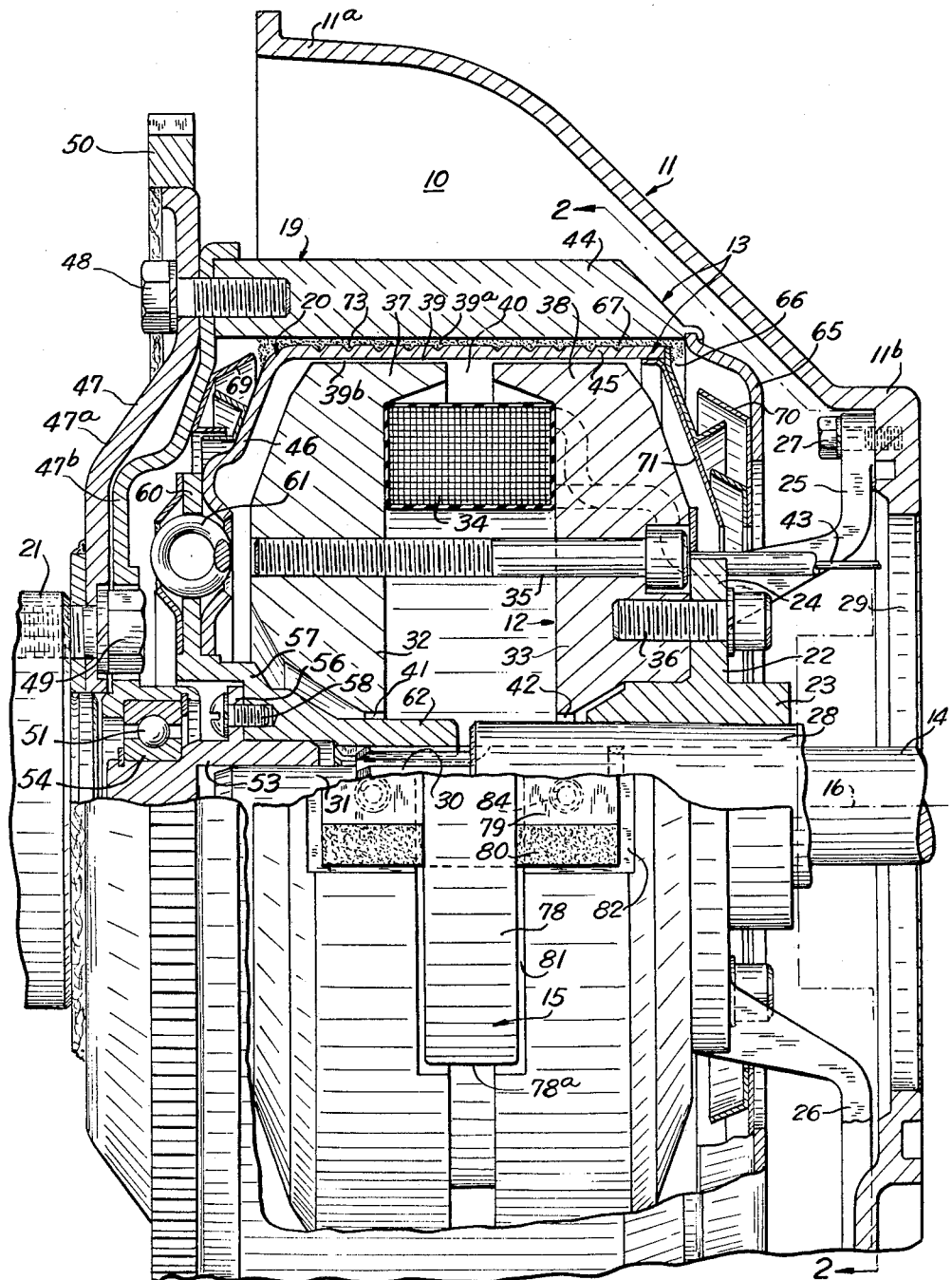
Figure 2:
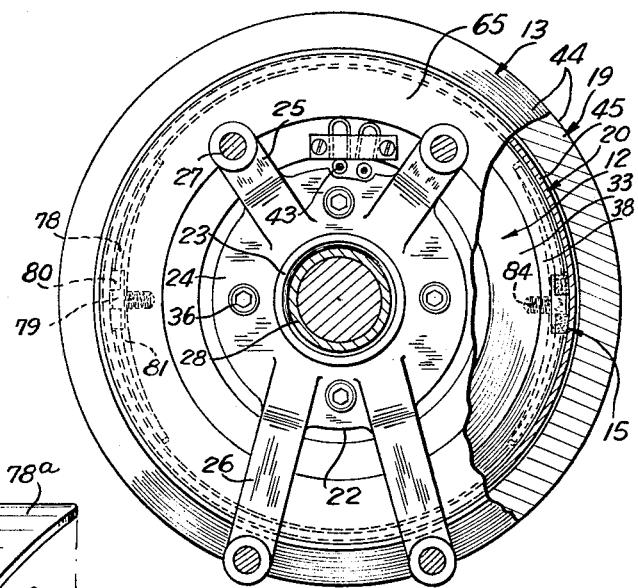
Figure 3:
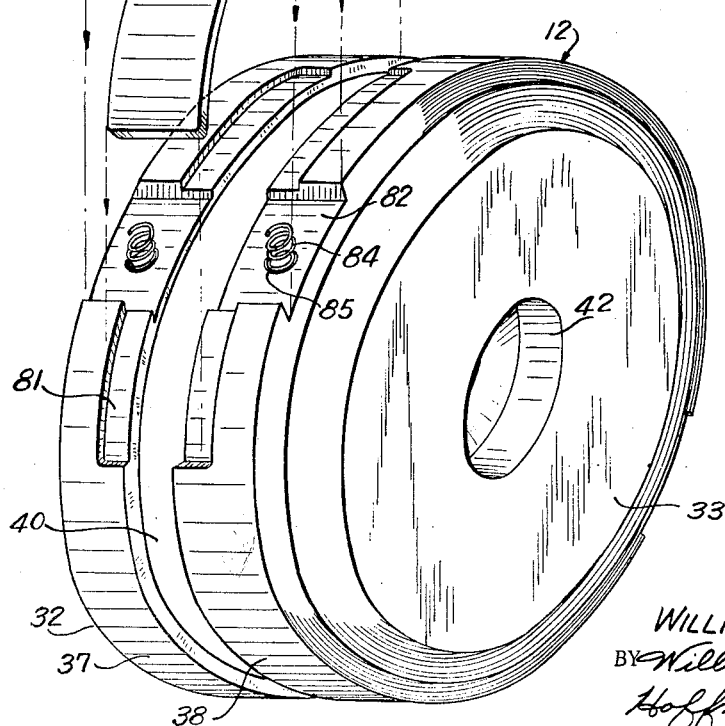

Other objects, novel characteristics and advantages of this invention will be apparent in the following detailed description and in the accompanying drawings forming a part of this specification and in which, FIG. 1 is a view partly in elevation and partly in vertical axial section showing novel electromagnetic apparatus of this invention;

FIG. 2 is a transverse section taken on section line 2—2 of FIG. 1 and with additional structure broken away to reveal one of the brake units; and FIG. 3 is a perspective view of the field means of the apparatus and also showing the associated brake means and the manner of mounting thereof on the field means.

A preferred embodiment of the novel electromagnetic apparatus 10 of this invention is shown in the accompanying drawings as comprising a housing 11 having field means 12 therein for producing magnetic field flux, a rotor means 13 operatively associated with the field means for delivering power through an output shaft 14, and brake means 15 effective between the field means and rotor means for preventing spinning or coasting of the latter when the field means is de-energized. The invention can be embodied in various different forms of electromagnetic apparatus whose specific uses require that spinning or coasting of the rotor means thereof be prevented when the field flux producing means of the apparatus is de-energized. The apparatus 10 is here shown as being an electromagnetic coupling apparatus in the form of a clutch of the magnetic particle type intended for use between a power source and an associated transmission, and this is the particular embodiment of the invention which is described in detail hereinafter.

The housing 11 is a stationary housing having a relatively large end portion 11$^a$ adapted for attachment to a portion of the apparatus containing the power source and a relatively small end portion 11$^b$ extending toward the associated transmission to which power is supplied by the output shaft 14. The field means 12 is here shown as being stationary and located in the housing 11 in a surrounding relation to the output shaft 14 and its rotation axis 16. The rotor means 13 comprises first and second annular rotors 19 and 20 in a surrounding air-gap relation to the field means 12 and of which the first rotor 19 is a power input rotor and the second rotor 20 is a power output rotor. The first rotor 19 is connected with a rotatable power input member 21 in a manner to be presently described, and the second rotor 20 is connected with the power output shaft 14 in a manner which will likewise be presently described.

There is provided in the housing 11 a mounting bracket 22 as a support for the output shaft 14 and the field means 12. The bracket 22 includes a central sleeve portion 23 having a projecting radial flange 22 extending therearound and also includes pairs of upper and lower arms 25 and 26 by which the bracket is attached to the housing 11. The arms 25 and 26 project from the flange 22 in an axially offset relation thereto and are secured to the housing portion 11$^b$ as by means of suitable screws 27. The output shaft 14 is rotatable in an inner sleeve 28 which extends into the housing 11 through an end opening 29 thereof and which inner sleeve is, in turn, supported in the sleeve portion 23 of the mounting bracket 22. For a purpose which will appear hereinafter, the inner end portion of the shaft 14 projects from the inner sleeve 28 as a splined portion 30 and an adjacent stem portion 31.

The field means 12 comprises a pair of axially adjacent annular pole members 32 and 33 and an electrically energizable field coil means 34. The pole members 32 and 33 are held in an assembled relation on opposite sides of the coil means 34 by screws 35 provided in the pole members at circumferentially spaced points. The field assembly comprising the pole members 32, 33 and the coil means 34 is mounted on the sleeve portion 23 of the bracket 22 and secured in such mounted relation by screws 36 extending into the pole member 33 through the radial flange 24.

The pole members 32 and 33 are circular in shape and the peripheral portions thereof provide two annular pole portions 37 and 38 which are presented toward the rotor means 13 and are spaced therefrom by an intervening annular air gap 39. The pole portions 37, 38 partially overhang the coil means 34 and are separated by an intervening annular air space extending around the field means 12 as a radial slot 40 in the periphery thereof. Centrally thereof the pole members 32 and 33 are provided with axially aligned openings 41 and 42 which are coaxial with the rotation axis 16. Energizing current can be supplied to the coil means 34 from an available source through suitable lead conductors 43.

The rotor 19 includes an outer annular drum portion 44 extending around the field means 12 and spaced from the annular pole portions 37 and 38 by the full radial width of the air gap 39. The rotor 20 includes an inner annular drum portion 45 which is carried by a disk portion 46 and lies between the drum portion 44 and the pole portions 37, 38. The drum portion 45 is spaced from the drum portion 44 by an outer annular gap portion 39$^a$ and from the pole portions 37, 38 by an inner annular gap portion 39$^b$. The drum portions 44 and 45 extend axially across the pole portions 37 and 38 in a spanning relation to the radial slot 40. The inner surface of the drum portion 45 is a smooth cylindrical surface for co-operation of the brake means 15 therewith as will be presently described and, on the outer surface thereof, is provided with a plurality of circumferential grooves 73 for increasing the area of contact with the magnetic material 67.

The drum portion 44 is carried by disk means 47 with which this drum portion is connected by suitable screws 48. The disk means 47 is here shown as comprising two adjacent disk members 47$^a$ and 47$^b$ of which the disk member 47$^a$ is secured to the input member 21 by screws 49 and has an annular gear 50 mounted on the outer periphery thereof. The disk member 47$^b$ has an antifriction bearing 51 mounted therein centrally thereof which provides support for the rotor 20 and for the inner end portion of the output shaft 14.

A cup-shaped member 53 mounted in the inner race 54 of the antifriction bearing 51 has the stem portion 31 of the output shaft 14 received therein and includes a radial flange 56 to which a carrier 57 is secured by screws 58. The carrier 57 includes a radial annular flange 60 on which the rotor 20 is mounted by means which includes a plurality of cushioning springs 61. The carrier 57 also has a central sleeve portion 62 which is drivingly connected with the output shaft 14 through the splined portion 30 of the latter.

At the end of the drum portion 44 remote from the disk means 47 the rotor 19 is provided with an annular end member 65 so that this rotor has an internal annular chamber 66 therein lying adjacent the inner surface of the drum portion 44 and between the disk member 47$^b$ and the end member 65. The chamber 66 contains particulate magnetic material 67 of a suitable character to serve as a torque transmitting medium between the rotors 19 and 20 when the field means 12 is energized and the particulate material is subjected to the action of the magnetic flux produced by the field means.

The particulate magnetic material 67 is located in the outer gap portion 39$^a$, as shown in FIG. 1, and is retained in the chamber 66 of the rotor 19 by suitable packings 69 and 70 of the labyrinth type. The packing 69 is at one end of the rotor 19 and is located between the disk member 47$^b$ and the adjacent disk portion 46 of the rotor 20. The packing 70 is located at the other end of the rotor 19 and is located between the end member 65 and an adjacent annular extension portion 71 of the rotor 20.

From the construction of the electromagnetic apparatus 10 as thus far described it will now be recognized that, when the field means 12 is energized by current supplied to the coil means 34, the magnetic flux produced by the field means will pass from one to the other of the pole portions 37, 38 by traversing the drum portions 44 and 45 of the rotors 19 and 20 and passing through the magnetic material 67. The passage of the flux through the magnetic material 67 changes the character thereof by solidifying, or partially solidifying, such material and thereby rendering the material capable of transmitting torque from the rotor 19 to the rotor 20.

The driving of the rotor 20 from the rotor 19 under these conditions results in torque being transmitted to the output shaft 14 through the carrier 57 and in such torque being delivered by the output shaft to the associated transmission. When the coil means 34 is de-energized the production of magnetic flux ceases, whereupon the magnetic material 67 resumes its loose or fluid state and the driving connection from the rotor 19 to the rotor 20 is interrupted. The brake means 15 serves to prevent spinning or coasting of the rotor 20 after such de-energization of the field means 12 and which brake means will be described next.

The brake means 15 is mounted on the pole means of the field means 12 and is here shown as being of the friction type and acts against the cylindrical internal surface of the drum portion 45 of the rotor 20. The brake means 15 may comprise one or more brake units and, when a plurality of brake units are provided, they are spaced around the field means 12 in a distributed and balanced ararngement. FIGS. 2 and 3 show the apparatus 10 and having two such brake units.

The brake means 15 comprises a bowed resilient member 78 of strip-like form extending circumferentially of the field means 12 along a portion of the periphery of the pole means thereof. The brake means 15 also comprises shoe means 79 attached to the intermediate portion of the bowed member 78 in a transversely extending relation thereto and carrying friction means 80. The bowed member 78 and the shoe means 79 are made of suitable magnetic material so that the flux of the field means 12 will exert a pulling force thereon when the coil means 34 is energized.

To accommodate the brake means 15 the pole portions 37 and 38 are cut away along the radial slot 40 so as to provide an arcuate recess 81 extending part-way along the periphery of the pole means and a transverse recess 82 intersecting the intermediate portion of the arcuate recess. The arcuate recess 81 is of a length to receive the bowed member 78 therein with the end portions 78$^a$ of the bowed member in metallic engagement with the pole portions 37 and 38 adjacent the ends of the arcuate recess. For this position of the bowed member 78 it will lie in a spanning relation to the slot 40, and the shoe means 79 will be received in the transverse slot 82 and will likewise lie in a spanning relation to the slot 40.

When the bowed member 78 and the shoe means 79 are received in the slots 81 and 82 as just described, these members will provide a parallel flux path with respect to the drum portion 44 of the rotor 19. By reason of this parallel flux path relation of the bowed member 78 and the shoe means 79, a sufficient portion of the field flux will act on the brake means 15 while another portion of the flux will traverse the drum portions of the rotors 19 and 20 to activate the particulate magnetic material 67. The brake means 15 thus utilizes for the actuation thereof a portion of the magnetic field flux being produced by the same field means 12 which controls the delivery of power to the output shaft 14.

The intermediate portion of the bowed member 78 of the brake means 15 normally tends to spring away from the pole portions 37 and 38 of the field means and this movement of the bowed member is utilized to press the friction means 80 against the drum portion 45 of the rotor 20 for producing an antispin braking action on the latter. Regardless of the position of the intermediate portion of the bowed member 78, the end portions 78$^a$ thereof always remain engaged in the end portions of the arcuate recess 81 and in metal-to-metal engagement with the pole portions 37 and 38. This relationship is important because there with accordingly be a zero air gap, that is to say no air gap, at the ends of the bowed member 78 when the field means 12 is energized and the field flux will have maximum effectiveness on the bowed member and in passage therethrough in the above-mentioned parallel flux path. By reason of such continuous engagement of the end portions 78$^a$ in the recess 81, the bowed member and the shoe means 79 will always be retained in proper assembly position on the field means 12.

To achieve increased braking action on the drum portion 45 by the brake means 15, spring means is provided comprising, in this case, a pair of compression springs 84 which are mounted in radial openings 85 of the pole portions 37 and 38. The openings 85 are located in the transverse recess 82 so that the springs 84 will be effective against the underside of the shoe means 79 at axially spaced points along the latter. The springs 84 thus press the friction means 80 against the drum portion 45 with an evenly distributed braking force which will not be likely to cause tilting or jamming of the shoe means 79.

When the coil means 34 of the field means 12 is de-energized, the pulling action of the field flux on the bowed member 78 and the shoe means 79 ceases, and the friction means 80 is then effectively pressed against the drum portion 45 by the flexing movement of the bowed member 78 and the expansive action of the springs 84 to thereby stop the rotor 20 against spinning or coasting rotation thereof. When the coil means 34 is again energized to produce a clutch-engaged condition of the apparatus 10 for the delivery of torque by the output shaft 14, the pull exerted by the field flux on the bowed member 78 and the shoe means 79 retracts these members into the recesses 81 and 82 and retains the same in retracted position as long as the coil means 34 remains energized. The retracted position of the shoe means 79 disengages the friction means 80 from the drum portion 45 to permit free movement of the rotor 20 in driving the output shaft 14.

From the accompanying drawings and the foregoing detailed description it will now be readily understood that this invention provides novel electromagnetic apparatus in which brake means prevents undesired spinning or coasting rotation of a rotor means and is actuatable in response to a portion of the magnetic flux produced by the same field means as that which controls the delivery of power from the apparatus. It will now also be understood that this invention provides novel electromagnetic apparatus of this character which is especially suitable for use as a coupling for transmitting torque from a power source to an associated transmission, and that the apparatus is of a compact and practical construction having important structural and functional advantages including those already pointed out above.

Although the electromagnetic apparatus of this invention has been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. In electromagnetic apparatus, a housing, field means in said housing comprising annular pole means and energizable field coil means associated with said pole means, rotatable power delivery means including rotor means in said housing in an adjacent annularly coextensixe relation to said pole means so as to provide with the latter a path for magnetic flux produced by said field means, and brake means comprising bowed resilient means mounted on said pole means and friction means movable by said bowed means to a normally frictionally engaged relation with said rotor means for retarding rotation of the latter when said coil means is de-energized, said brake means being responsive to flux from said field means and movable thereby to a released position relative to said rotor means when said coil means is energized.

2. Electromagnetic apparatus according to claim 1 wherein said bowed means has end portions thereof in zero air-gap relation to said pole means.

3. Electromagnetic apparatus according to claim 1 wherein said pole means comprises a pair of pole members in an axially adjacent relation with a space therebetween, said brake means being disposed in a spanning relation to said space.

4. Electromagnetic apparatus according to claim 1 wherein said pole means comprises a pair of pole members in an axially adjacent relation with a space therebetween, said brake means being recessed into the periphery of said pole means and disposed in a spanning relation to said space.

5. Electromagnetic apparatus according to claim 1 wherein said brake means comprises a plurality of brake units in an annularly spaced series, each said brake unit comprising a bowed resilient member and brake shoe means carried by an intermediate portion of said bowed member, said bowed member having end portions thereof in zero air-gap relation to said pole means.

6. In electromagnetic coupling apparatus, a housing, field means in said housing comprising annular pole means and energizable field coil means associated therewith, annular rotor means in said housing comprising relatively rotatable power input and power output rotors in associated air-gap relation to said pole means and forming with the latter a path for magnetic flux produced by said field means, particulate magnetic material in the air gap between said input and output rotors and responsive to said flux for transmitting torque from one to another of said rotors, and brake means between said pole means and one of said rotors and having a normally applied position for retarding rotation of the latter, said brake means being responsive to flux from said field means and movable thereby to release said one rotor in response to energization of said coil means.

7. Electromagnetic coupling apparatus according to claim 6 wherein said one rotor includes a drum portion, said brake means being mounted on said pole means and comprising friction means engageable with said drum portion.

8. Electromagnetic coupling apparatus according to claim 6 wherein said one rotor includes a drum portion, said brake means being mounted on said pole means and comprising friction brake units spaced therearound and engageable with said drum portion.

9. Electromagnetic coupling apparatus according to claim 6 wherein said one rotor includes a drum portion, said pole means comprising pole members in an axially adjacent relation with space therebetween, said brake means being mounted on said pole means in spanning relation to said space and having friction means engageable with said drum portion.

10. Electromagnetic coupling apparatus according to claim 6 wherein said one rotor includes a drum portion, said pole means comprising pole members in an axially adjacent relation with space therebetween, said brake means comprising bowed resilient means disposed in spanning relation to said space and having end portions in zero air-gap relation to said pole means; and friction means carried by said bowed means and engageable with said drum portion.

11. In electromagnetic coupling apparatus, rotor means comprising a pair of annularly coextending relatively rotatable power input and power output rotor members, field means on one radial side of said rotor means comprising annular pole means and energizable coil means associated therewith, said rotor members having an air gap therebetween and said rotor members providing with said pole means a magnetic field flux path extending across said air gap, particulate magnetic material in said air gap between said input and output rotor members and responsive to the magnetic field for transmitting torque from one to another of said rotor members, brake means mounted on said pole means comprising a friction unit, and spring means acting to normally press said friction unit against one of said rotor members for retarding rotation thereof, said brake means being responsive to flux from said field means for releasing the pressure of said friction means on said one rotor member when said coil means is energized.

12. In electromagnetic coupling apparatus, a housing, a power input rotor in said housing and having an internal annular chamber and a first annular drum portion extending around the periphery of said chamber, stationary field means in said housing comprising annular pole means having field coil means thereon, said pole means extending into said chamber and being spaced from said first drum portion by an air gap, a power output rotor in said housing and having a second annular drum portion located between said pole means and said first drum portion and spaced from the latter by a portion of said air gap, particulate magnetic material in said chamber and air gap portion and responsive to magnetic flux from said field means for transmitting torque from said input rotor to said output rotor, and brake means responsive to a portion of the flux from said field means and effective between said pole means and said second drum portion.

13. Electromagnetic coupling apparatus according to claim 12 wherein said brake means comprises friction means and spring means effective to press the friction means against said second drum portion for retarding rotation of said output rotor when said coil means is de-energized, said brake means being movable by said flux portion in opposition to said spring means to disengage said friction means from said second drum portion when said coil means is energized.

14. Electromagnetic coupling apparatus according to claim 12 wherein said brake means comprises bowed resilient means mounted on said pole means and having end portions in zero air-gap relation to the latter, and friction means carried by said bowed means and normally engaged with said second drum portion, said brake means being responsive to said flux portion for disengaging said friction means from said second drum portion.

15. Electromagnetic coupling apparatus according to claim 12 wherein said brake means comprises a plurality of friction brake units spaced around said pole means, each said brake unit comprising friction means normally engaged with said second drum portion, said brake units being respective to said flux portion for disengaging the friction means from said second drum portion.

16. Electromagnetic coupling apparatus according to claim 12 wherein said brake means provides a flux path in parallel relation to said first and second drum portions.

17. In electromagnetic coupling apparatus, a housing, field means in said housing comprising annular pole means and energizable field coil means associated therewith, annular rotor means in said housing comprising relatively rotatable power input and power output rotors operatively associated with said pole means and forming with the latter a path for magnetic flux produced by said field means, said output rotor being driven by said input rotor in response to energization of said field coil means, brake means associated with said field means, and spring means effective on said brake means for urging the same toward a brake-applied condition relative to one of said rotors for retarding rotation thereof upon de-energization of said coil means, said brake means being responsive to magnetic flux from the field means and being movable toward brake-released condition in opposition to said spring means by flux from said field means.

18. In an electromagnetic coupling apparatus, a housing, stationary field means in said housing including an annular pole means and energizable field coil means associated therewith, rotor means in said housing comprising relatively rotatable input and output rotors operatively associated with said pole means and forming with the latter a path for magnetic flux produced by said field means, said output rotor being driven by said input rotor in response to energization of said field coil means, brake means mounted on said field coil means and movable relative thereto, and spring means normally urging said brake means toward a brake applied condition relative to said output rotor for retarding rotation of the latter when said coil means is de-energized, said brake means being responsive to said magnetic flux from said field means and being movable thereby in opposition to said spring means for holding the brake means in a released condition when said coil means is energized.

References Cited by the Examiner
FOREIGN PATENTS 997,828  9/51  France.
916,919  8/54  Germany.

DAVID J. WILLIAMOWSKY, *Primary Examiner*.